April 12, 1932.　　　C. O. PETTERSSON　　　1,854,060

SPECTACLES

Filed June 14, 1929

WITNESSES

INVENTOR
Charles O. Pettersson
BY
ATTORNEYS

Patented Apr. 12, 1932

1,854,060

UNITED STATES PATENT OFFICE

CHARLES O. PETTERSSON, OF NEW YORK, N. Y.

SPECTACLES

Application filed June 14, 1929. Serial No. 370,882.

This invention relates to spectacles, and has for an object to provide an improved construction wherein the lenses and associated parts are held out of contact with the face or held in contact with the face without any weight being supported by the face.

Another object of the invention is to provide spectacles wherein supporting means are provided on the temples of the spectacles and positioned to rest on the cheek bones so that the weight of the spectacles may be carried principally at this point rather than by the nose.

A further object, more specifically, is to provide a pair of spectacles with gripping and fulcrum means positioned to rest on the cheek bones with weighted temples or side pieces formed to counterbalance the weight of the lenses and associated parts, while at the same time gripping to a certain extent the rear part of the head.

In the accompanying drawings,—

Figure 1:
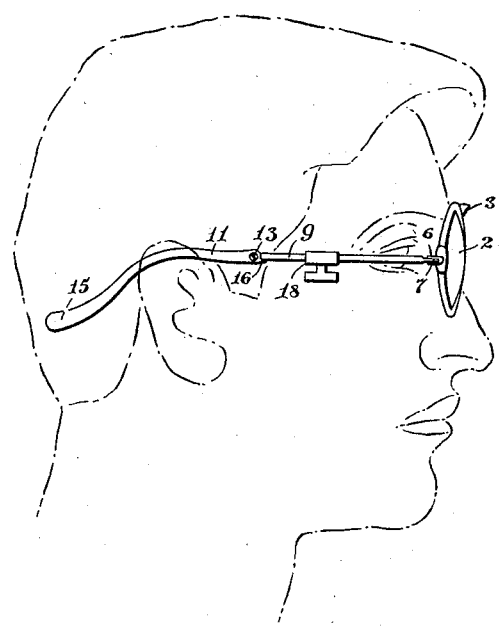
Figure 1 is a side view of a pair of spectacles disclosing an embodiment of the invention, the same being shown applied to a head.
Figure 2:
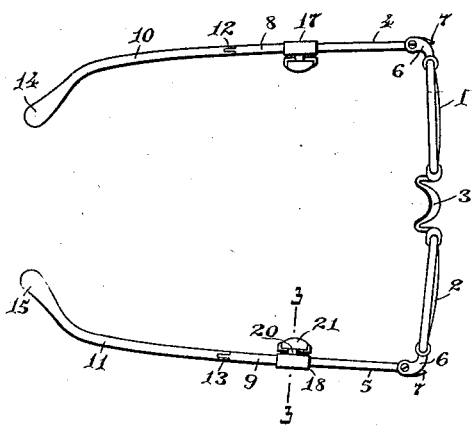
Figure 2 is a top plan view of the spectacles shown in Figure 1.
Figure 3:
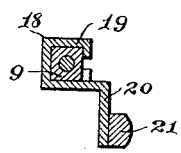
Figure 3 is an enlarged fragmentary sectional view through Figure 2 on the line 3—3.

Referring to the accompanying drawings by numerals, 1 and 2 indicate the lenses which are connected by a bridge or nose-piece 3. The construction of this nose-piece and lenses may be of any desired kind, but for the purpose of lightness the lenses may be made on the style of what is known as a drop shape form. Any other form may be used without departing from the spirit of the invention. Connected with the outer part of the lenses 1 and 2 or to the lens rims where rims are used, are temple or side pieces 4 and 5, the connection being the usual hinges 6. These hinges are provided with the usual abutment 7, so that they will not swing out beyond a certain point, and consequently, will permit the resiliency of the temples 4 and 5 to function. These temples may be of different shapes, as desired, but preferably the front sections 8 and 9 are square exteriorly. These sections may consist of a central wire with a celluloid or other covering presenting a pleasing appearance, and one preferably square in cross-section, as shown in Fig. 3. Hinged to these sections are the rear or balancing sections 10 and 11, the hinges 12 and 13 being preferably slightly in advance of the ear. Sections 10 and 11 are preferably curved downwardly and toward each other, as shown in Figs. 1 and 2, so that the weighted ends 14 and 15 will not only counterbalance the weight of the lenses 1 and 2 and associated parts, but will also grip to a certain extent the rear part of the head. The weighted ends 14 and 15 may be made of any desired material, but are preferably made of lead covered with celluloid. By increasing or decreasing the curve of sections 10 and 11 the weighted ends will have a greater or less leverage action in counterbalancing the front part of the spectacles. From Fig. 1 it will be noted that the respective hinges 12 and 13 are provided with projecting abutments 16 which permit the sections to fold in one direction but not in the opposite direction, whereby the weights or weighted ends 14 and 15 will function properly and will use the members 17 and 18 as fulcrums to support the lenses 1 and 2 and the bridge 3, so that they will remain out of contact with the face and nose, or preferably so that they will merely be in very light contact therewith. To assist this counterbalancing weight and to reduce the weighted members 14 and 15 to a minimum, the fulcrum members 17 and 18 also act as supporting members. By increasing the friction of members 10 and 11 against the head the lead weights may be reduced. As shown in Fig. 3, each of the members 17 and 18 is formed with an encircling section 19 slidably mounted on the section 9 and merging into a bendable extension finger 20 carrying a contact member 21 which may be leather, fibre or other desired material, and which is cemented or otherwise secured to member 20. As shown in Fig. 2, the members 17 and 18 are arranged opposite each other, and as indicated in Fig. 1, they rest on top of the cheek bone, or near the top. In this way they act as a fulcrum for the weights 14 and 15, and by reason of the resiliency in the temples 4 and 5 they grip the face at these two points. By this gripping action and by the counterbalancing action of the weights the front part of the spectacles are supported out of contact with the face, if desired, while the remaining parts contact in such a manner as not to be objectionable. In this way the line or soreness on the nose sometimes produced by the nosepiece 3 is prevented and yet the lenses are held in their proper position for use at all times. The hinges 12 and 13 may be eliminated, if desired, but preferably they are used in order to shorten the temples 4 and 5, this shortening action being desirable in order that the spectacles may be placed in a comparatively small case when not in use.

What I claim is:—

1. A pair of spectacles, comprising a pair of lenses, a bridge for connecting said lenses, counter-balanced temples (side pieces) for supporting said lenses, and supporting members mounted on said temples and positioned to engage the cheek bones in front of the ears for normally supporting the temples so that the lenses and bridge will be held out of contact with the nose and the temples out of contact with the ears.

2. A pair of spectacles, including a pair of lenses, a bridge connecting said lenses, temples for supporting said lenses and said bridge, counterbalancing means carried at the rear of said temples for counterbalancing the weight of said lenses and said bridge and a pivotal support mounted on each of said temples acting as fulcrums for said counterbalancing means whereby said bridge is held out of contact with the nose.

3. A pair of spectacles, including a pair of lenses, a bridge connecting said lenses, temples for connecting said lenses and said bridge, a pair of pinching and supporting members mounted on said temples and positioned to rest on the cheek bone when the spectacles are in use so as to take up substantially all of the weight of the lenses and bridge in order to prevent pressure on the nose, said pinching and supporting members acting as fulcrums and a weight connected to the free end of each of said temples acting to counterbalance said lenses and bridge.

4. A pair of spectacles, including a pair of lenses, a bridge connecting said lenses, temples for supporting said lenses and said bridge, counterbalancing means carried at the rear of said temples for counterbalancing the weight of said lenses and said bridge, and supporting means mounted on said temples intermediate the ends thereof and in front of the ears of the person wearing the spectacles, acting in the double capacity of supporting members and fulcrums, said means acting as a fulcrum for the counterbalancing means, and also as supports for the temples, lenses and bridge.

5. A pair of spectacles, including a pair of temples, a pivotal support for the temples adapted to rest on the cheek bone when the spectacles are in use, said pivotal supports being mounted on said temples and a weight for each temple arranged at the rear of the temple acting to counterbalance certain parts of the spectacles, said supports being positioned intermediate the ends of the temples and in front of the ears of the person wearing the spectacles and acting as fulcrums for said weights.

6. In a pair of spectacles provided with a pair of temples, one part of each temple being square in cross-section, a supporting member carried by each of said square parts, said supporting members having square tubular portions fitting onto the respective temples and adjustable longitudinally thereof, a depending finger provided with gripping means for engaging and gripping the face when the spectacles are in use, said supporting members being normally postioned approximately half-way between the ends of the temples and acting as fulcrums and a weight carried by the free end of each of the temples acting through the temples and said fulcrums for counterbalancing the front part of the spectacles.

CHARLES O. PETTERSSON.